United States Patent
Bhat et al.

(10) Patent No.: US 10,503,155 B2
(45) Date of Patent: Dec. 10, 2019

(54) METHOD FOR CONTROLLING A PROCESS PLANT USING A REDUNDANT LOCAL SUPERVISORY CONTROLLER

(71) Applicant: ABB Schweiz AG, Baden (CH)

(72) Inventors: Shrikant Bhat, Nagpur (IN); Michael Lundh, Vasteras (SE)

(73) Assignee: ABB Schweiz AG, Baden (CH)

( * ) Notice: Subject to any disclaimer, the term of this patent is extended or adjusted under 35 U.S.C. 154(b) by 192 days.

(21) Appl. No.: 15/321,188

(22) PCT Filed: Jun. 25, 2015

(86) PCT No.: PCT/IB2015/054769
§ 371 (c)(1),
(2) Date: Dec. 21, 2016

(87) PCT Pub. No.: WO2015/198256
PCT Pub. Date: Dec. 30, 2015

(65) Prior Publication Data
US 2017/0199515 A1    Jul. 13, 2017

(51) Int. Cl.
*G05B 15/02* (2006.01)
*G05B 19/18* (2006.01)
(Continued)

(52) U.S. Cl.
CPC ..... *G05B 19/4184* (2013.01); *G05B 19/0428* (2013.01); *G05B 2219/24182* (2013.01)

(58) Field of Classification Search
CPC ............ G05B 19/4184; G05B 19/0428; G05B 2219/24182; G05B 17/02; G05B 19/0425; G05B 9/03; Y02P 90/14; Y02P 90/18
See application file for complete search history.

(56) References Cited

U.S. PATENT DOCUMENTS

| 2005/0004684 A1* | 1/2005 | Cribbs ................ G05B 13/042 700/31 |
| 2006/0047776 A1* | 3/2006 | Chieng ................ G06F 11/203 709/217 |

(Continued)

FOREIGN PATENT DOCUMENTS

EP    2293159 A1    3/2011

OTHER PUBLICATIONS

International Search Report issued in connection with International Application No. PCT/IB2015/054769, dated Sep. 16, 2015, 3 pages.
(Continued)

*Primary Examiner* — Zhipeng Wang
(74) *Attorney, Agent, or Firm* — Barnes & Thornburg LLP

(57) ABSTRACT

The present invention discloses a method for controlling a process using a plurality of regulatory controllers (160) connected to a remote supervisory controller (120) over a communication link (155) and to a local supervisory controller (130) over a process bus (170). The remote supervisory controller (120) controls the regulatory controllers (160) over the communication link (155) with the use of a remote process model. During operation of the plant a local process model is configured in the local supervisory controller (130) with control data send on the communication link (155). Upon failure of the communication link (155) the local supervisory controller (130) takes over the control through the process bus (170), acting as a redundant or a backup controller. The method comprises: monitoring transmission of control data between the remote supervisory controller (120) and the plurality of controllers (160) over the communication link (155); determining functional correlations between measured process variables and control process variables, based on the control data and a predetermined correlation function; configuring local process model (Continued)

based on the determined functional correlations; and providing intermediate set points using the configured local process model, upon an intermediate failure of the communication link (155), where the communication link recovers from the intermediate failure within a predetermined time period.

6 Claims, 2 Drawing Sheets

(51) Int. Cl.
    *G05B 19/418*     (2006.01)
    *G05B 19/042*     (2006.01)

(56) References Cited

U.S. PATENT DOCUMENTS

| | | | |
|---|---|---|---|
| 2007/0142936 A1* | 6/2007 | Denison | G05B 13/0275 700/29 |
| 2013/0198557 A1* | 8/2013 | Bensinger | G06F 11/1451 714/3 |
| 2013/0275313 A1* | 10/2013 | Vahid | G06Q 10/20 705/305 |
| 2013/0285799 A1* | 10/2013 | Probin | G05B 15/02 340/12.22 |
| 2015/0046325 A1* | 2/2015 | McCracken | G06Q 20/1085 705/43 |
| 2017/0082998 A1* | 3/2017 | Grosch | G05B 9/03 |

OTHER PUBLICATIONS

Written Opinion issued in connection with International Application No. PCT/IB2015/054769, dated Sep. 16, 2015, 6 pages.
International Preliminary Report on Patentability issued in connection with International Application No. PCT/IB2015/054769, dated Dec. 27, 2016, 7 pages.

* cited by examiner

METHOD FOR CONTROLLING A PROCESS PLANT USING A REDUNDANT LOCAL SUPERVISORY CONTROLLER

CROSS-REFERENCE TO RELATED APPLICATIONS

This application is a U.S. national stage of International Application Serial No. PCT/IB2015/054769, filed Jun. 25, 2015, which claims priority to Indian Patent Application No. 3099/CHE/2014, filed Jun. 26, 2014. The entire disclosures of both of the foregoing applications are hereby incorporated by reference.

FIELD OF INVENTION

The present invention relates to control systems and industrial automation. More particularly, the present invention relates to redundant secondary controllers of control systems.

BACKGROUND

In automation context, advanced process control applications are control applications supervise and regulate the local control applications. Advanced process control applications, due to their high processing requirements, are present on remote servers and communicate with the local control applications within the plant site in terms of assigning the set-points to the local control applications. The local control applications targets to attain the received set points. For example, a model predictive control assigns set-point to the plant level PID control and PID controller targets to attain that.

Usually advanced process control applications involve use of model, control, optimization, analytical computations, etc., with different levels of complexity and often require an expert support. While shifting advanced applications to a cloud platform or a remote computing platform, the computational complexity and expertise stays with the cloud platform, and only the optimal set points are communicated to the plant level local control applications. In case of failure of connectivity to the cloud platform, or any other issues that prevent communication between the advanced process control application and the local control application, the local control application keeps operating at the previously assigned set-points from the advanced control application.

Conventionally, one approach to handle loss of connectivity between the cloud platform and the local control application, a backup or redundant network access point having similar functionality as the advanced control application is provided. Upon detection of loss of connectivity, the redundant network access point is selected to act as the advanced control application. In another approach, a secondary communication channel is present between the cloud platform and the local control application. The advanced control application is accessed through the secondary communication channel upon failure of the primary communication channel.

However, these approaches involve considerable costs. Therefore, there is a need for an improved method and system which is capable of handling loss of connectivity between the advanced control processes on the cloud platform and the local control infrastructure present in the plant

DETAILED DESCRIPTION OF THE INVENTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
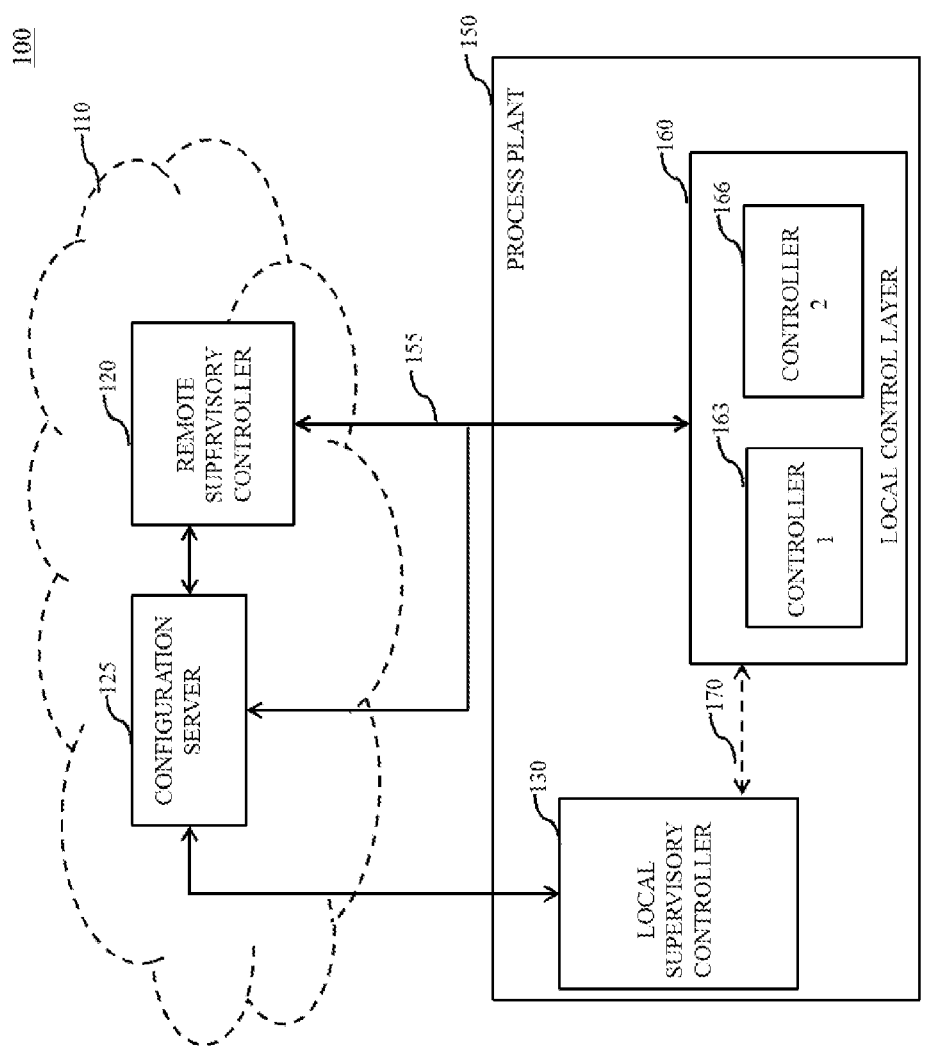
FIG. 1 illustrates a system for controlling a process using a plurality of field devices in a process plant, in accordance with various embodiments of the present invention.

FIG. 1 illustrates a system 100 controlling a process using a plurality of field devices (not shown in FIG. 1) in a process plant 150. The plurality of field devices includes one or more sensors located in various areas of the process plant for measuring process variables associated with the process. These process variables are herein referred to as measured process variables. Additionally, the plurality of field devices includes one or more actuators which regulate various physical parameters in relation to the process.

The plurality of field devices including the sensors and the field devices are operatively connected to a plurality of corresponding regulatory controllers 160 (illustrated in figure to as controller 163 and controller 166), thereby forming one or more control loops. The regulatory controllers 160, on the basis of set points in relation to certain process variables (herein after referred to as control variables) and the measurements from the sensors, regulate the actuators accordingly. The regulatory controllers 160 receive set points in relation to the one or more control variables from a remote supervisory controller 120 during normal mode of operation.

The remote supervisory controller 120 is located outside the process plant 150. The remote supervisory controller 120 is connected to the plurality of regulatory controllers 160 via a communication link 155. The remote supervisory controller 120 receives information associated with one or more measured process variables, and generates one or more set points in relation to one or more control process variables, using a remote process model based on the information associated with the one or more measured process variables. In an embodiment, the remote supervisory controller 120 is hosted as a service on a remote computing platform 110.

Additionally, the system 100 includes a local supervisory controller 130 connected to the plurality of regulatory controllers 160 over a process bus 170 of a control network within the process plant 150. The local supervisory controller 130 includes a local process model (not shown in FIG. 1). The local process model of the local supervisory controller 130 is configured by a configuration server 125. Upon an intermediate or temporary failure of communication link 155, the local supervisory controller 130 using the configured local process model, provides intermediate set points to the plurality of regulatory controller 160 till the communication link 155 is recovered and connection with the remote supervisory controller 120 is reestablished. The local supervisory controller 130 works a temporary back up for the remote supervisory controller 120 till the communication link 155 recovers from the intermediate failure. These aspects are further explained in the description of FIG. 2.

Figure 2:
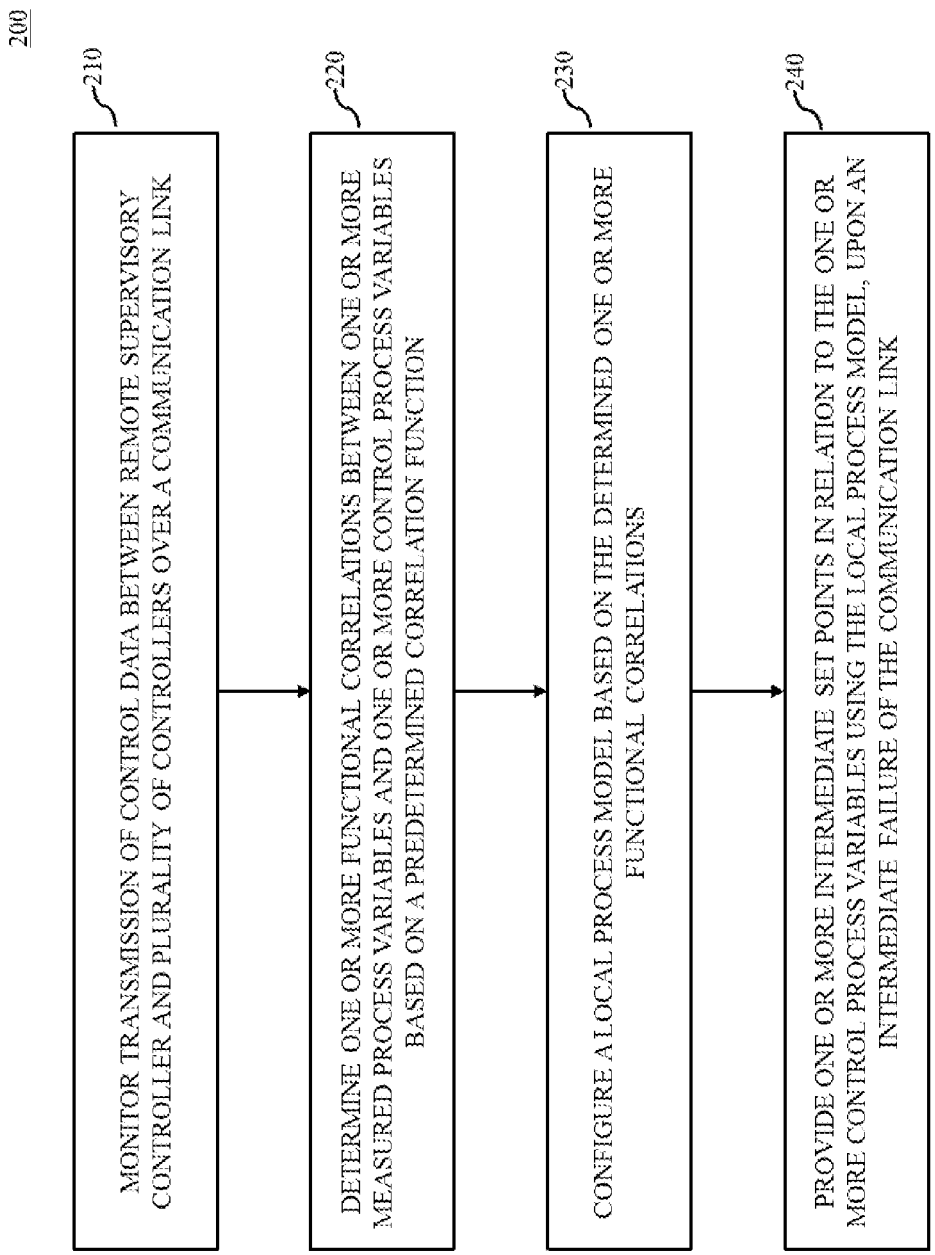
FIG. 2 illustrates a method for controlling a process using a plurality of field devices in a process plant, in accordance with various embodiments of the present invention.

FIG. 2 illustrates a method 200 for controlling a process using a plurality of field devices in the process plant 150, in accordance with various embodiments of the present invention.

At step 210, the configuration server monitors transmission of the information associated with one or more measured process variables, and the one or more set points in relation to one or more control process variables;

FIG. 2 illustrates a method 200 of assisting a first operator using the operator assistance tool during one or more engineering activities including configuration of a plurality of devices (115, 117 and 119), in accordance with various embodiments of the present invention.

At step 210, the configuration server 125 monitors transmission of control data between the remote supervisory controller 120 and the plurality of controllers 160 over the communication link 155. The control data herein refers to information associated with one or more measured process variables, and one or more set points in relation to one or more control process variables, generated using the remote process model based on the information associated with the one or more measured process variables.

At step 220, the configuration server 125 determines one or more functional correlations between the one or more measured process variables and the one or more control process variables, based on the control data and a predetermined correlation function. The configuration server 125 utilizes a plurality of statistical methods commonly known in the art to determine one or more functional correlations between the one or more measured process variables and the one or more control process variables. For example, if the configuration server 125 identifies from the control data that violation of a measured process variable results in new set points in relation to control process variable, the configuration server 125 determines that a functional correlation exists between the measured process variable and the control process variable. Particularly, using the remote supervisory controller and the control data, the configuration server 125 identifies the one or more control variables for which new set points are generated when certain measured process variables violate process constraints. Accordingly, the configuration server 125 determines functional correlations between the control variables and measured variables.

Similarly in an embodiment, when the number of measured variables is more than the number of control variables or vice versa, the configuration server 125 determines the significance of each control variable on a measured variable.

At step 230, the configuration server 125 configures the local process model based on the determined one or more functional correlations. In an embodiment, the configuration server 125 configures the local process model in accordance with the significance of each control process variable on a measured process variable. Upon the intermediate or temporary failure of the communication link 155, at step 240, the local supervisory controller provides one or more intermediate set points in relation to the one or more control process variables using the configured local process model, to the plurality of controllers 160 for regulating the one or more field devices.

The communication link 155 recovers from the intermediate failure within a predetermined time period. In an embodiment, the predetermined time period is set by an operator of the process plant 150. In an embodiment, if the communication link 155 does not recover within the predetermined period of time, the local supervisory controller 130 raises an alarm. In an embodiment, the configuration server 125 keeps tuning and updating the functional correlations and accordingly configures the local supervisory controller.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling a process with a plurality of field devices in a process plant using a plurality of regulatory controllers, wherein the plurality of regulatory controllers are connected to a remote supervisory controller over a communication link and to a local supervisory controller over a process bus for receiving set points, the method comprising:

monitoring transmission of control data between the remote supervisory controller and the plurality of regulatory controllers over the communication link, wherein the control data includes (i) information associated with one or more measured process variables and (ii) one or more set points in relation to one or more control process variables generated using a remote process model based on the information associated with the one or more measured process variables;

determining one or more functional correlations between the one or more measured process variables and the one or more control process variables, based on the control data and a predetermined correlation function for configuring a local process model of the local supervisory controller;

configuring the local process model based on the determined one or more functional correlations; and providing one or more intermediate set points in relation to the one or more control process variables using the configured local process model, to the plurality of controllers for regulating the one or more field devices, upon an intermediate failure of the communication link, wherein the communication link recovers from the intermediate failure within a predetermined time period.

2. The method as claimed in claim 1, wherein the plurality of regulatory controllers includes one or more proportional integrative derivative (PID) controllers.

3. The method as claimed in claim 1, wherein the predetermined correlation function is set in the remote supervisory controller.

4. A system for controlling a process using a plurality of field devices in a process plant, the system comprising:

a plurality of regulatory controllers for regulating the plurality of field devices of the process plant, wherein the plurality of the regulatory controllers are connected to a process bus of a control network in the process plant;

a remote supervisory controller connected to the plurality of regulatory controllers via a communication link for receiving information associated with one or more measured process variables, and for generating and transmitting one or more set points in relation to one or more control process variables, using a remote process model based on the information associated with the one or more measured process variables; and a local supervisory controller configured to provide one or more intermediate set points in relation to the one or more control process variables using a local process model, to the plurality of controllers for regulating the one or more field devices, upon an intermediate failure of the communication link from which the communication link recovers within a predetermined time period; and a configuration server connected to the remote supervisory controller and configured to (i) monitor transmission of the information associated with one or more measured process variables and the one or more set points in relation to one or more control process variables; (ii) determine one or more functional correlations between the one or more measured process variables and the one or more control process variables based on a predetermined correlation function; and (iii) configure the local process model based on the determined one or more functional correlations.

5. The system as claimed in claim 4, wherein the plurality of regulatory controllers includes one or more proportional integrative derivative (PID) controllers.

6. The system as claimed in claim 4, wherein the predetermined correlation function is set in the remote supervisory controller.

* * * * *